United States Patent Office 3,404,206
Patented Oct. 1, 1968

3,404,206
NOVEL 2'-AMINO-THIAZOLO STEROIDS
Daniel Bertin, Montrouge, and Jacques Perronnet, Paris, France, assignors to Roussel-UCLAF, Paris, France, a corporation of France
No Drawing. Filed July 21, 1966, Ser. No. 566,740
Claims priority, application France, July 23, 1965, 25,797; Oct. 21, 1965, 35,779
15 Claims. (Cl. 424—241)

The invention relates to novel 2'-amino-thiazolo-[5',4'-16,17]-$\Delta^{1,3,5(10),16}$-estratetraenes of the formula

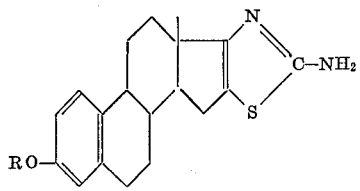

wherein R is selected from the group consisting of hydrogen, alkyl of 1 to 8 carbon atoms and phenyl alkyl with 1 to 2 alkyl carbon atoms and to a process for their preparation. The invention also relates to novel anti-hypophysial compositions and to a method of curbing excessive hypophysial activity in warm blooded animals.

Takeda et al. (Chem. Pharm. Bull. Tokyo, vol. 10, pp. 1173–77, 1962) have described 2 - amino - thiazolo androstanes with a saturated A ring or a $\Delta^4$-double bond such as compounds of the formula

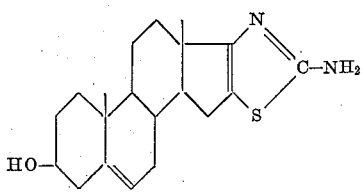

and

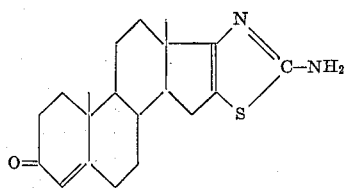

but they do not indicate any physiological activity for the compounds. However, the compounds of Formula I have interesting pharmacological activity, particularly an important curbing action on the hypophysis and are, therefore, useful for the treatment of excessive amounts in the hypophysis of the F.S.H. factor (folliculo-stimulating hormone gonadotrope) due to castration or menopause, and generally in all of these cases where a curbing of the hypophysial gonadotrophines is desired.

The particular advantage of the novel amino thiazolo steroids of Formula I with regard to known products endowed with an anti-F.S.H. activity, resides in the fact that they possess only a slight estrogenic activity. The significance of these new compounds lies in the fact that they can be administered at the time of any ailments occurring during menopause. Although most of the usual hypophysial inhibitors are also endowed with estrogenic activity, such as stilbene derivatives, or with progestomimetic activity, such as norethynodrel, whose use is limited by the occurrence of undesirable secondary manifestations, such as hemorrhages or nausea, the compounds of Formula I can be utilized in large dosages without any fear that any of the drawbacks of the known compounds will appear.

It is an object of the invention to provide novel 2'-amino - thiazolo-[5',4'-16,17]-$\Delta^{1,3,5(10),16}$-estratetraenes of Formula I.

It is another object of the invention to provide a novel process for the preparation of the 2' - amino - thiazolo steroids of Formula I and a novel intermediate therefor.

It is a further object of the invention to provide novel anti-hypophysial compositions.

It is an additional object of the invention to provide a novel method of curbing excessive hypophysial activity in warm-blooded animals.

These and other objects and advantages of the invention will become obvious from the following detailed description.

The novel 2' - amino - thiazole-[5',4'-16,17]-$\Delta^{1,3,5(10),16}$-estratetraenes of the invention have the formula

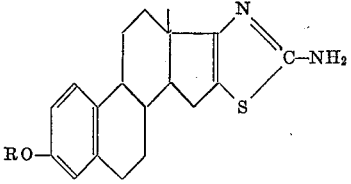

wherein R is selected from the group consisting of hydrogen, alkyl of 1 to 8 carbon atoms and phenyl alkyl with 1 to 2 alkyl carbon atoms. Examples of R are alkyl radicals such as methyl, ethyl, propyl, n-butyl, etc., and phenylalkyl radicals such as benzyl and phenethyl.

The novel process for the preparation of 2'-amino-thiazolo - [5',4' - 16,17]-$\Delta^{1,3,5(10),16}$-estratetraenes of Formula I comprises reacting a compound of the formula

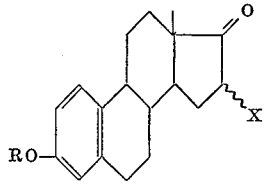

wherein R has the above definition and X is an α- or β-halogen selected from the group consisting of chlorine, bromine and iodine with thiourea in a lower alkanol having 1 to 8 carbon atoms to form the corresponding estratetraenes. X is preferably bromine or iodine and the lower alkanol is methanol, ethanol or tertiary butanol.

When the condensation reaction is effected in a primary lower alkanol with little stearic hinderance, such as methanol or ethanol, there is formed a corresponding 4'-alkoxy intermediate (which is the 17 - position of the steroid moiety) which can be isolated. This 3-OR-2'-amino-4'-alkoxy - 4',5' - dihydro thiazolo - [5',4' - 16,17]-$\Delta^{1,3,5(10)}$-estratriene intermediate may be saponified under alkaline conditions, such as by sodium hydroxide in methanol or subjected to a thermal treatment under vacuum to form the 2'-amino-thiazolo of Formula I.

When R is a benzyl on the starting $\Delta^{1,3,5(10)}$-estratriene of Formula II, the resulting 2'-amino-thiazolo steroid of Formula I can be subjected to hydrogenolysis to regenerate the phenolic hydroxy in the 3-position which can then be converted into any other desired ether.

The novel anti-hypophysial compositions of the invention are comprised of at least one 2'-amino-thiazolo-[5', 4',16,17]-$\Delta^{1,3,5(10),16}$-estratetraene of the formula

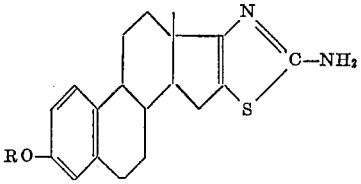

wherein R is selected from the group consisting of hydrogen, alkyl of 1 to 8 carbon atoms and phenyl alkyl with 1 to 2 alkyl carbon atoms and a major amount of a pharmaceutical carrier. The compositions may be in the form of injectable solution or suspensions, in ampules, in multiple dose flacons, in the form of implants, tablets, coated tablets, sublingual tablets and suppositories prepared in the usual manner.

The novel method of the invention of inhibiting hypophysis in warm-blooded animals comprises administering to the animals an effective amount of at least one 2'-amino-thiazolo-[5',4'-16,17] - $\Delta^{1,3,5(10),16}$-estratetraene of the formula

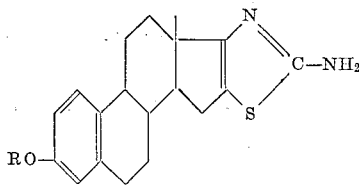

wherein R is selected from the group consisting of hydrogen, alkyl of 1 to 8 carbon atoms and phenyl alkyl with 1 to 2 alkyl carbon atoms. The said compounds may be administered orally, perlingually, transcutaneously or rectally. The usual useful dose is between 0.03 to 0.4 mg./kg. per dose and 0.08 to 0.8 mg./kg. per day for the adult, depending upon the mode of administration.

In the following examples there are described several preferred embodiments to illustrate the invention. However, it should be understood that the invention is not intended to be limited to the specific embodiments.

Example I. — Preparation of 3-methoxy-2'-amino-thiazolo-[5',4'-16,17]-$\Delta^{1,3,5(10),16}$-estratetraene 100 mg. of 3-methoxy-16 α-bromo-$\Delta^{1,3,5(10)}$-estratriene-17-one, prepared according to the process described by W. S. Johnson et al., J.A.C.S, vol 79, page 2005 (1957), were dissolved in 6 cc. of anhydrous tertiary butanol and after 45 mg of thiourea were added, the resulting solution was refluxed for 18 hours Then, the solution was concentrated to half its volume and neutralized by the addition of a few cc. of a saturated aqueous solution of sodium bicarbonate, and finally water was added. Then, the solution was cooled, vacuum filtered, washed with water and dried and the residue thus formed was dissolved in hot anhydrous tetrahydrofuran. By adding water, dropwise, and by inducing crystallization, 57.5 mg. of 3 - methoxy - 2' - amino-thiazolo-[5',4'-16,17]-$\Delta^{1,3,5(10),16}$-estratetraene having a melting point of 280–285° C. were obtained.

This compound is not described in the literature.

Example II. — Preparation of 3-methoxy-2'-amino-thiazolo-[5',4'-16,17]-$\Delta^{1,3,5(10),16}$-estratetraene Step A: Preparation of 3-methoxy-2'-amino-4'-ethoxy-4',5' - dihydrothiazolo - [5',4'-16,17] - $\Delta^{1,3,5(10)}$ - estratriene.—1.5 gm. of 3-methoxy-16 α-bromo-$\Delta^{1,3,5(10)}$-estratriene-17-one prepared according to the process described by W. S. Johnson et al., J.A.C.S., vol. 79, page 2005 (1957), were introduced into 15 cc of ethanol and after 625 mg of thiourea were added thereto, the reaction mixture was heated at reflux for 24 hours with constant agitation Then, the reaction mixture was poured into an aqueous solution of sodium bicarbonate and extracted with ethyl acetate. The extracts obtained were washed with saturated aqueous sodium chloride, dried and evaporated to dryness. The residue formed was dissolved in ether, treated with animal charcoal and filtered. 2 cc. of an anhydrous gaseous 4 N hydrochloric acid solution in ether were added to the filtrate which was then vacuum filtered and washed with ether. The precipitate thus obtained was dissolved in 25 cc. of 25% aqueous ethanol and after 4 cc. of an N soda solution were introduced dropwise therein, crystallization was initiated and the mixture was agitated at room temperature for 2 hours. Then, the reaction mixture was vacuum filtered, washed with 60% aqueous ethanol and dried to obtain 1.29 gm. of 3-methoxy-2'-amino-4'-ethoxy-4',5' - dihydrothiazolo-[5',4'-16,17]-$\Delta^{1,3,5(10)}$-estratriene having a melting point of 196–197° C. The product was insoluble in water and soluble in chloroform.

*Ultra-violet spectra* (in ethanol):

$\lambda_{max}$. 278 m$\mu$  $\epsilon$=22,200
$\lambda_{max}$. 287 m$\mu$  $\epsilon$=20,200

*Analysis*. — $C_{22}H_{30}O_2N_2S$; molecular weight=386.55. Calculated: C, 68.35%; H, 7.81%; N, 7.25%; S, 8.30%; O, 8.28%. Found: C, 67.8%; H, 7.8%; N, 7.1%; S. 7.9%; 0, 8.7%.

This compound is not described in the literature.

Step B: Preparation of 3-methoxy-2'-amino-thiazolo-[5',4'-16,17]-$\Delta^{1,3,5(10),16}$-estratetraene.—Under an atmosphere of nitrogen, 880 mg. of 3-methoxy-2'-amino-4'-ethoxy-4',5'-dihydrothiazolo - [5',4' - 16,17] - $\Delta^{1,3,5(10)}$-estratriene were dissolved in 10 cc. of ethanol heated to reflux, and after 0.3 cc. of a sodium hydroxide solution was added thereto, reflux was maintained for ½ hour. Then, the reaction mixture was diluted with a few cc. of water, then cooled, vacuum filtered, washed with 20% aqueous ethanol and finally dried. The product was recrystallized from anhydrous tetrahydrofuran to obtain 675 mg. (a yield of 85%) of 3-methoxy-2'-amino-thiazolo-[5',4'-16,17]-$\Delta^{1,3,5(10),16}$-estratetraene having a melting point of 289° C. and a specific rotation of $[\alpha]_D^{20}$=+98°±2° (c.=0.85% in pyridine).

The product was colorles sand was insoluble in ethanol, very slightly soluble in alcohol and soluble in chloroform, tetrahydrofuran and dimethylformamide.

*Analysis*. — $C_{20}H_{24}ON_2S$; molecular weight=340.48. Calculated: C, 70.55%; H, 7.1%; N, 8.23%; S, 9.41%. Found: C, 70.2%; H, 7.0%; N, 7.9%; S, 9.5%.

The said product was also obtained by the following procedure. 50 mg. of 3-methoxy-2'-amino-4'-ethoxy-4', 5'-dihydrothiazolo-[5',4'-16,17]-$\Delta^{1,3,5(10)}$-estratriene were heated under vacuum for 1 minute at a temperature of 200° C. to obtain 40 mg. (a yield of 90%) of 3-methoxy-2'-amino-thiazolo-[5',4'-16,17] - $\Delta^{1,3,5(10),16}$-estratetraene having a melting point of 275–280° C.

Pharmacological data
Hypophysial inhibitory activity

Many couples of female rats, each couple being sisters, were united parabiotically. One of the animals was castrated and treated daily over a period of 10 days, starting on the day following the pairing. The animals were sacrificed on the 11th day. The genital organs were removed and weighed. The castrated rats received by oral administration 6.25γ and 12.50γ per day of 3-methoxy-2'-amino-thiazolo-[5',4'-16,17]-$\Delta^{1,3,5(10),16}$-estratetraene dissolved in olive oil mixed with 5% benzylic alcohol. The experiment included control animals parabiotically united; a castrated animal parabiotically paired with a whole animal and whole animals not parabiotically united. Table I summarizes the results obtained.

TABLE I

| Groups | Daily doses in γ | Castrated donor rat | | | Intact receiver rat | | | |
|---|---|---|---|---|---|---|---|---|
| | | Aver. body weights in gm. | | Uterus, mg. | Aver. body weights in gm. | | Ovaries, mg. | Uterus, mg. |
| | | Initial | Final | | Initial | Final | | |
| Free controls | 0 | | | | 67 | 97 | 26.18 | 83.28 |
| United controls | 0 | 74 | 87 | 34.32 | 72 | 92 | 159.22 | 146.39 |
| 3-methoxy-2'-amino-thiazolo-[5',4'-16,17]-1,3,5(10),16-estratetraene. | 6.25 | 73 | 88 | 63.68 | 66 | 83 | 141.46 | 169.98 |
| | 12.50 | 70 | 74 | 64.31 | 69 | 75 | 23.30 | 93.58 |

The results of Table I show that the product of the invention possesses an important inhibitory hypophysial activity at a dose of 12.50γ. Moreover, its estrogenic action is slight as can be seen from the increase in weights of the uterus of the castrated female animal in the test and by the equivalent of the rat-unit, determined on the castrated rat according to the Allen and Doisy test, which dose, orally adminstered, amounts to about 5 mg.

Various modifications of the compositions and method of the invention may be made without departing from the spirit or scope thereof and it is to be understood that the invention is to be limited only as defined in the appended claims.

We claim:

1. A 2' - amino-thiazolo - [5',4' - 16,17]-$\Delta^{1,3,5(10),16}$-estratetraene of the formula

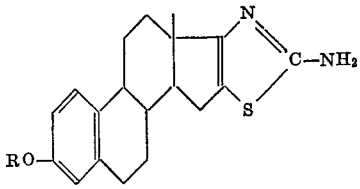

wherein R is selected from the group consisting of hydrogen, alkyl of 1 to 8 carbon atoms and phenyl alkyl with 1 to 2 alkyl carbon atoms.

2. The compound of claim 1 wherein R is methyl.

3. A process for the preparation of a 2'-aminothiazolo-[5',4' - 16,17]-$\Delta^{1,3,5(10),16}$-estratetraene of claim 1 which comprises reacting a compound of the formula

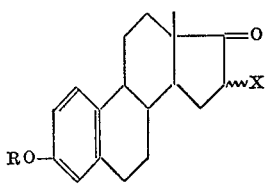

wherein R has the above definition and X is an α- or β-halogen selected from the group consisting of chlorine, bromine and iodine with thiourea in a lower alkanol having 1 to 8 carbon atoms to form the corresponding estratetraenes.

4. The process of claim 3 wherein R is selected from the group consisting of methyl, ethyl, propyl and n-butyl.

5. The process of claim 3 wherein R is benzyl.

6. The process of claim 3 wherein the lower alkanol is selected from the group consisting of methanol, ethanol and tert.-butanol.

7. The process of claim 3 wherein the halogen is selected from the group consisting of bromine and iodine.

8. The process of claim 3 wherein the lower alkanol is selected from the group consisting of methanol and ethanol and the resulting intermediate 3 - OR - 2' - amino-4' - alkoxy - 4',5' - dihydrothiazolo - [5',4'-16,17]-$\Delta^{1,3,5(10)}$ - estratriene wherein the 4'-alkoxy is derived from the said lower alkanol is reacted under alkaline conditions to form the said 2' - amino - thiazolo-[5',4'-16,17]-$\Delta^{1,3,5(10),16}$-estratetraene.

9. The process of claim 3 wherein the lower alkanol is selected from the group consisting of methanol and ethanol and the resulting intermediate 3 - OR - 2' - amino-4' - alkoxy - 4',5' - dihydrothiazolo - [5',4' - 16,17]-$\Delta^{1,3,5(10)}$-estratriene wherein the 4'-alkoxy is derived from the said lower alkanol is heated under vacuum to form the said 2' - amino - thiazolo - [5',4'-16,17]-$\Delta^{1,3,5(10),16}$-estratetraene.

10. A 2' - amino - 4' - alkoxy - 4,5' - dihydrothiazolo-[5',4'-16,17]-$\Delta^{1,3,5(10)}$-estratriene of the formula

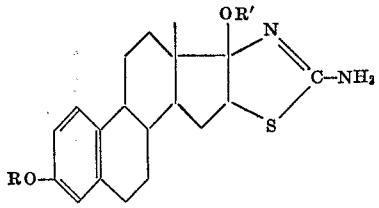

wherein R is selected from the group consisting of hydrogen, alkyl of 1 to 8 carbon atoms and phenylalkyl having 1 to 2 carbon atoms and R' is derived from a primary lower alkanol.

11. A compound of claim 10 wherein R is methyl and R' is ethyl.

12. An anti-hypophysial composition comprised of at least one 2' - amino - thiazolo-[5',4'-16,17]-$\Delta^{1,3,5(10),16}$-estratetraene of claim 1 and a major amount of a pharmaceutical carrier.

13. A composition of claim 12 wherein R is methyl and the composition contains 1 to 10% of the said estratetraene.

14. A method of curbing excessive hypophysial activity in warm-blooded animals which comprises administering to warm-blooded animals a safe and effective amount of at least one 2' - amino - thiazolo - [5',4' - 16,17]-$\Delta^{1,3,5(10),16}$-estratetraene of claim 1.

15. The method of claim 14 wherein R is methyl.

References Cited

Robinson et al., J. Med. Chem., pp. 793–795, November 1963.

HENRY A. FRENCH, *Primary Examiner.*